United States Patent
Gelibert

(10) Patent No.: US 7,223,918 B2
(45) Date of Patent: May 29, 2007

(54) CABLE CLAMP

(75) Inventor: Stéphane Gelibert, Sassenage (FR)

(73) Assignee: A. Raymond & CIE (DE)

( * ) Notice: Subject to any disclaimer, the term of this patent is extended or adjusted under 35 U.S.C. 154(b) by 0 days.

(21) Appl. No.: 10/547,023

(22) PCT Filed: Feb. 4, 2004

(86) PCT No.: PCT/EP2004/000988

§ 371 (c)(1),
(2), (4) Date: Aug. 25, 2005

(87) PCT Pub. No.: WO2004/077620

PCT Pub. Date: Sep. 10, 2004

(65) Prior Publication Data

US 2006/0144610 A1    Jul. 6, 2006

(30) Foreign Application Priority Data

Feb. 25, 2003    (DE) .................. 103 07 835

(51) Int. Cl.
*H02G 3/00*    (2006.01)
(52) U.S. Cl. .................. 174/95; 174/68.1; 174/96; 174/97; 174/481; 248/68.1
(58) Field of Classification Search ............. 174/481, 174/482, 68.1, 68.3, 72 A, 72 R, 95, 96, 174/97, 98, 99 R; 248/68.1, 71, 73, 74.1, 248/74.2
See application file for complete search history.

(56) References Cited

U.S. PATENT DOCUMENTS 4,564,163 A * 1/1986 Barnett .................. 248/71
5,243,139 A * 9/1993 Law .................. 174/153 G
5,675,128 A * 10/1997 Simon .................. 174/152 G (Continued)

FOREIGN PATENT DOCUMENTS

DE    2328049 B    8/1974

(Continued)

OTHER PUBLICATIONS

International Search Report for PCT Application No. PCT/EP2004/000988 dated May 26, 2004 (3 pages).

*Primary Examiner*—Dhiru R. Patel
(74) *Attorney, Agent, or Firm*—Dickinson Wright, PLLC

(57) ABSTRACT

The invention relates to a single-part cable clamp with a base (1) which is fixed to a carrier part, a bearing surface formed on said base (1) for a cable or bundle of cables which are to be fixed and a cable cover (6) which is joined to the base (1) by means of a flexible strip (5), said cable cover encompassing the cable or bundle of cables and being able to be engaged with the base (1), said base (1) being U-shaped. The insides of the U-shaped limbs (3) of the base are provided with transversally extending ribs (4) as known per se. A clamp cover (6) is joined to the upper edge of one U-shaped limb (3) by means of a flexible strip (5). Said cover can be inserted between the U-shaped limbs (3) and an adjustable fixed control element (9), preferably in the form of a screw head is formed thereon and can be placed in two positions. In one position thereof, the fixed control element (9) engages with the ribs (4) of the U-shaped limbs (3). In another position, said control element is disengaged therefrom. The cable clamp automatically adapts to different diameters of cable and maintains the cable in a safe and stationary manner. Said cable clamp is easy to use and can be disengaged in an especially simple manner with the aid of a suitable tool, preferably a screwdriver, if a cable needs to be dismantled without causing damage thereto, whereby said cable clamp can be reused.

18 Claims, 1 Drawing Sheet

U.S. PATENT DOCUMENTS

| | | | | |
|---|---|---|---|---|
| 6,126,122 A * | 10/2000 | Ismert | ................ | 248/68.1 |
| 6,206,331 B1 * | 3/2001 | Keith et al. | ............ | 248/74.1 |
| 6,378,811 B1 * | 4/2002 | Potter et al. | ............ | 248/68.1 |
| 6,398,169 B1 * | 6/2002 | Streit | ............ | 248/71 |
| 6,463,631 B2 * | 10/2002 | Noda | ............ | 248/68.1 |
| 6,809,257 B2 * | 10/2004 | Shibuya | ............ | 174/72 A |
| 7,011,277 B2 * | 3/2006 | Mizukoshi et al. | ............ | 248/68.1 |

FOREIGN PATENT DOCUMENTS

| | | |
|---|---|---|
| DE | 2626412 A1 | 12/1977 |
| DE | 19504253 C | 4/1996 |
| DE | 19856945 C | 6/2000 |
| FR | 2130753 A | 11/1972 |
| GB | 1556488 A | 11/1979 |

\* cited by examiner

CABLE CLAMP

CROSS-REFERENCE TO RELATED APPLICATIONS

This application is a National Stage of International Application No. PCT/EP2004/000988, filed on Feb. 4, 2004, which claims priority to German Patent Application No. 103 07 835.5, filed on Feb. 25, 2003. The disclosures of the above applications are incorporated herein by reference.

BACKGROUND OF THE INVENTION

The invention relates to a one-piece cable clamp with a base, which can be fixed to a carrier part, a bearing surface formed on this base for a cable or a bundle of cables to be fixed, and a clamp cover, which is joined to the base by a flexible strip and which encloses the cable or bundle of cables that can engage with the base.

Such a cable clamp is known from DE 26 26 412. Two opposing limbs project at a right angle from the clamp cover of this cable clamp. The outer surfaces of these limbs are ribbed with a sawtooth shape. In the base, openings with catch means are provided on both sides of the bearing surface formed on the base for the cable or the bundle of cables. After a cable or a bundle of cables has been placed on the bearing surface, the clamp cover is bent onto the connecting strip between the clamp cover and the base and its limbs are inserted into the openings next to the bearing surface. The clamp cover can be pressed down until the cable or bundle of cables is clamped tight between the cover and the bearing surface and the catch means of the openings engage the ribs of the limbs at a corresponding height. For this purpose, the limbs are formed such that they bend inward and underneath the base when they contact the carrier part. Thus, the cable can be locked at a number of different heights on the limbs and the clamp adapts to different diameters of the cable or bundle of cables.

A disadvantage of this cable clamp is that it cannot be disengaged again if it is necessary to set the cable or the bundle of cables free again and possibly to mount them again to the same cable clamp. The known cable clamp must be destroyed, thus made unusable, and replaced by a new clamp to achieve these tasks.

A two-part cable clamp with a U-shaped foundation or base is known from French Patent No. 2,130,753. Here, the bent floor of the U forms the bearing surface for the cable or the bundle of cables and the inner surfaces of both U limbs have transversely extending ribs. A separate plunger with an essentially rectangular base surface is equipped on its two narrow sides with ribs corresponding to the ribs of the U limbs. The plunger also has a central opening with internal threads which opens on the bottom side into a recess, which is suitable for receiving a pressure plate. In the opening, a fixing screw is screwed in, with which the pressure plate is connected tightly by a pin. After a cable or a bundle of cables has been placed on the floor surface of the U-shaped foundation, the plunger is inserted between the U limbs and, so that the plunger is held, its ribbed narrow sides are offset by 90° relative to the ribbed U limbs. As soon as the bottom side of the plunger or the pressure plate which remains drawn into the plunger comes into contact with the cable or the bundle of cables, the plunger is turned 90°, so that the ribs of the plunger engage with those of the U limbs. Then the fixing screw is tightened, which moves the pressure plate out from the plunger to contact the cable or the bundle of cables with pressure. Through corresponding notches in the bottom side of the pressure plate, this cable clamp can be used for cables with different diameters. Disadvantages of this cable clamp are that it consists of two separate parts, which are not connected to each other, so that there is still the risk of losing a part, and also the rather difficult and time-consuming manipulation involved with its assembly. The cable clamp, which can be used for various cable diameters through a plurality of notches in the bottom side of the plunger, is also very complicated and makes the production of the device more expensive. Here, the clamp can be adapted only to fixed diameters given by the shape of the notches, thus it is not continuously adjustable.

There exists a need for a one-piece cable clamp, which is simple and reliable in its use and manipulation, which can also be disengaged and then reused easily and without causing damage. A cable should be held tightly by the clamp in its closed state, such that the cable cannot move in the clamp, and thus also relative to the carrier part.

However, the cable clamp should also be able to be disassembled again in a simple way, without damaging the cable itself or the cable clamp. In addition, there should be the ability to secure rigidly and also to disassemble several cables with different diameters with minimum space requirements on a carrier part.

SUMMARY OF THE INVENTION

This is realized according to the invention in that the base is formed with a U shape and, as is known, its U limbs have on their inner surface transversely extending ribs and the floor of the base forms the bearing surface for a cable; and a clamp cover is also connected to the top edge of one U limb by means of a flexible strip, wherein this cover can be inserted between the U limbs and on this cover a fixing element is formed, which can move and which can be brought into two different positions, in one of these positions the fixing element engages the ribs of the U limbs and in the other position this engagement is disengaged.

In this way, the handling of the cable clamp is extremely simple. The two parts, namely the base and clamp cover, are connected to each other so that they cannot be lost. In order to clamp a cable placed in the base tight, the fixing element is first turned to the position in which it cannot engage the U limbs and the clamp cover is pushed between the U limbs. As soon as the cover contacts the cable with pressure as much as possible, the fixing element is brought into engagement with the ribs. Because this engagement can be disengaged in a similarly simple way, the cable can be disassembled again without damaging the cable clamp or having to make it unusable, and it remains reusable. In addition, there is practically no risk that a cable could be damaged during disassembly. The engagement of the fixing element to the ribs of the U limbs is realized corresponding to the appropriate cable diameter at different heights, so that an automatic adaptation is imparted.

Preferably, side clamping tabs projecting from the bottom side and inclined relative to each other are formed on the clamp cover. These enclose the cable to be clamped tightly, so that it is finally held rigidly in the cable clamp. Because the clamping tabs inclined relative to each other spread out accordingly, an adaptation to different cable diameters also takes place here automatically.

According to a preferred embodiment, a screw-head-shaped fixing element with activation slot is connected to the top side of the clamp cover by means of an elastically twistable shaft. Two opposing locking flaps project to the side from the fixing element. These flaps can be brought into two different positions by twisting the fixing element on the shaft. In one of these positions, they engage the ribs of the U limbs of the base, and in the other position this engagement is disengaged. Thus, both the clamping process itself and also the disengagement of the engagement for disassembly can be realized easily with a screwdriver.

The locking flaps of the fixing element can be provided on their side surfaces with a ribbed groove; therefore, their engagement can be made more secure.

According to a preferred embodiment, the flexible strip connects the top side of the fixing element to the top edge of one U limb of the base.

It is advantageous if stops for the clamp cover are formed on two diagonally opposite side edges of the U limbs of the base in order to prevent the clamp cover from sliding away from the base to the side.

A catch means, preferably a catch hook, is formed on the bottom side of the base. With this catch, the cable clamp can be secured in a corresponding catch opening of a carrier part.

The clamping tabs inclined relative to each other on the clamp cover can each form an edge, which contacts and slides along the limbs when the clamp cover is inserted between the U limbs of the base on its ribs. Therefore, the ribs can easily engage the edges such that the edge on one side is so small that it does not hinder the insertion of the clamp cover, but on the other side is sufficient for preventing unintentional backward sliding of the clamp cover during assembly. Therefore, handling is made easier.

One essential advantage of the invention is that several such cable clamps can form a space-saving clamp device for several cables, which can have different diameters. Here, several cable clamps arranged one next to the other are joined tightly to each other with their U limbs connected to those of the adjacent cable clamp.

One such preferred cable clamp device consists of four individual cable clamps, which are connected tightly to each other one next to the other at their U limbs.

Preferably, such a cable clamp device is produced in one piece and the U limbs of adjacent cable clamps are preferably fused to each other.

In a clamp device comprising several, preferably four, individual cable clamps, a catch hook for securing to a carrier part is formed on the bottom side of the base of only two of the outer cable clamps.

BRIEF DESCRIPTION OF THE DRAWINGS

The invention is described in more detail below using examples with reference to the attached drawings; shown are FIG. 1, a perspective view of a preferred embodiment of a clamp device, which comprises four units of a cable clamp according to the invention, FIG. 2, a front view of the clamp device according to FIG. 1, FIG. 3, a plan view of the clamp device according to FIG. 1, and FIG. 4, a view towards a narrow side of the clamp device according to FIG. 1.

DETAILED DESCRIPTION OF THE PREFERRED EMBODIMENT

Figure 1:
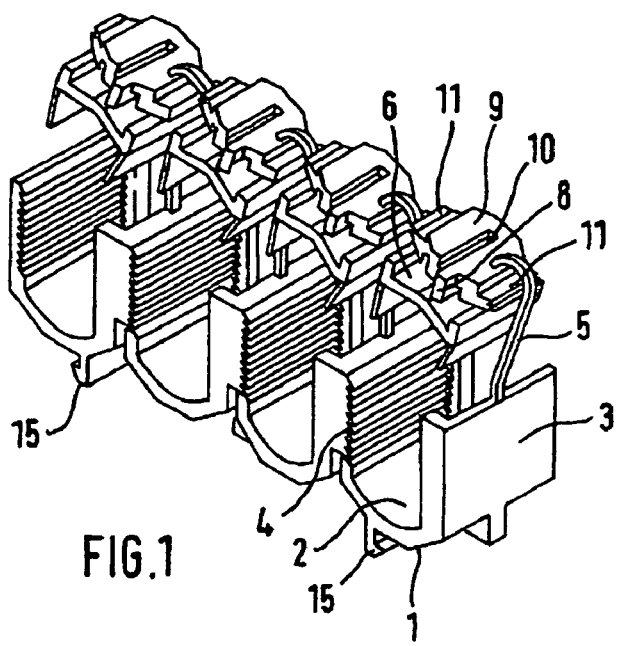
Figure 4:
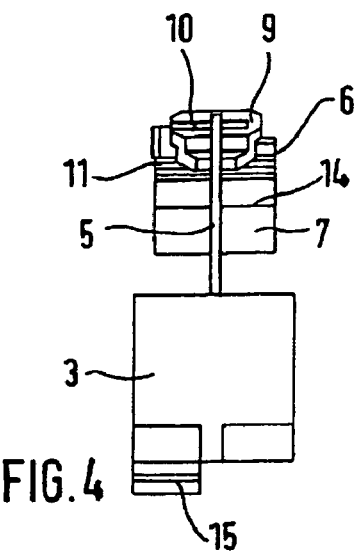
Figure 2:
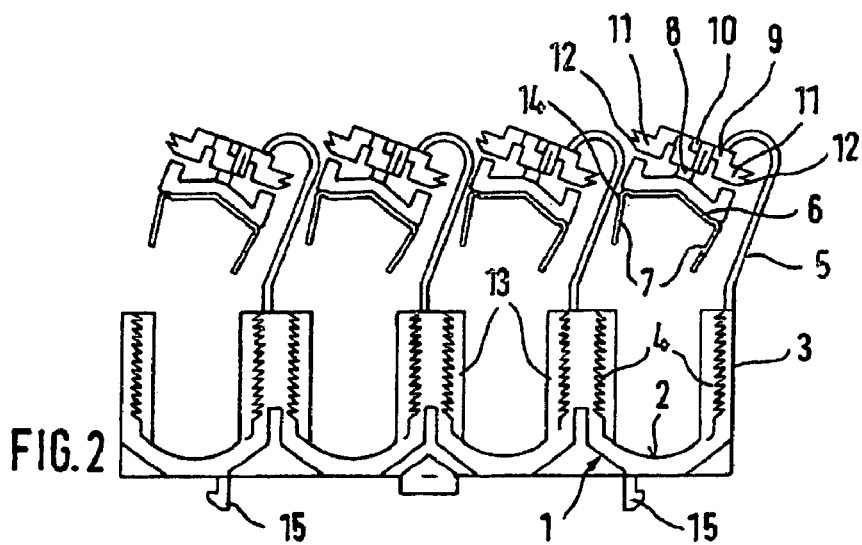
Figure 3:
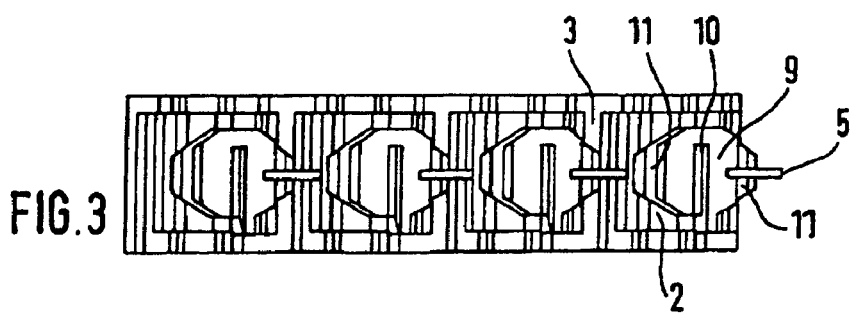

The embodiment of the invention shown in the drawing comprises four equal units, of which each unit can be used individually as a cable clamp, so that to understand the embodiment it is sufficient to describe just one of the units in more detail as the cable clamp.

Each individual cable clamp consists of a U-shaped foundation or base 1, whose floor is formed as a bearing surface 2 for a cable or a bundle of cables and whose U limbs 3 are provided on their inner surfaces with transversely extending, sawtooth-shaped ribs 4, as is known. The clamp cover 6, which also has an approximate U shape through clamp tabs 7 formed on the sides, is connected to the top edge of one U limb 3 by a flexible strip 5 that is shaped in the form of a wire in the embodiment. These clamp tabs 7 can be easily aligned with each other, which simplifies the insertion of the clamp cover 6 into the U-shaped base 1. The clamp tabs 7 of the clamp cover 6 are not ribbed. On the side facing away from the clamp tabs 7, the clamp cover 6 is connected to a screw-head-shaped fixing element 9 by means of an elastically bendable and twistable shaft 8. This element has an activation slot 10 and two opposing locking flaps 11, which are suitable for engaging with the ribs 4 of the U limbs 3 of the base 1. For this purpose, the locking flaps 11 project laterally somewhat past the clamp cover 6 and are formed on the sides of this element. For the engagement, the locking flaps 11 can have ribs or a ribbed groove 12 on their side surfaces. Due to the elastically twistable shaft 8, the fixing element 9 can be twisted into a position in which the locking flaps 11 engage the ribs 4 of the U limbs 3 relative to the clamp cover 6 with the aid of a suitable tool, preferably a screwdriver, and into a different position in which this engagement is disengaged or released.

When a cable or a bundle of cables is laid in the base 1, the clamp cover 6 is inserted between the U limbs 3 of the base 1 and pressed downward until it contacts the cable with pressure. Because the clamp tabs 7, as described above, are inclined slightly, relative to each other, on each of them an edge 14 is produced, which slides along the U limbs 3 when moved on the ribs 4 and which can realize an easy engagement in this position, but without actually preventing movement. The slight engagement of the edges 14 on the ribs 4 is used merely to prevent unintentional backward sliding of the clamp cover 6 during assembly. Finally, the clamp tabs 7 enclose and clamp the cable. Here, the clamp tabs 7 can be spread apart different amounts, so that adaptation to different cable diameters is realized automatically. The different cable diameters here lie preferably in the range of 4 mm to 11 mm.

The downward pressing of the clamp cover 6 is realized preferably with the aid of a screwdriver, which engages in the activation slot 10 of the fixing element 9 and with which the fixing element 9 is turned relative to the clamp cover 6 and the base 1, such that the locking flaps 11 cannot engage in the ribs 4 of the U limbs 3 and the downward movement is not hindered. If the clamp cover 6 finally contacts the cable with pressure and the clamp tabs 7 enclose the cable tightly, then the fixing element 9 is turned so that its locking flaps 11 engage the ribs 4, which fixes the cable in the base 1. A number of ribs 4 at different heights allows engagement of the locking flaps 11 to the ribs 4 to correspond to different cable diameters. Thus, the cable is held rigidly in the cable clamp. To prevent the clamp cover 6 from sliding out of the base 1 on its open sides, diagonally opposite, inward directed stops 13 are formed on the side edges of the U limbs 3.

In order to disengage the cable clamp, the fixing element 9 is disengaged again by turning the fixing element 9, and the clamp cover 6 is pulled from the base 1, wherein the edges 14 of the clamp tabs 7 can again slide along the ribs 4. Then the cable can be removed from the clamp without any further action. Here, neither the cable nor the cable clamp is damaged and both remain reusable.

Cable clamps, which are used individually, have catch means, e.g., in the form of a catch hook 15, on the bottom side of their base 1. With this catch, the clamps can be secured in the carrier part in a corresponding catch opening.

According to the invention, several of the described cable clamps can be joined to form a one-piece clamp device. According to the preferred embodiment shown in the drawing, four equal cable clamps arranged one next to each other are connected tightly to each other at their U limbs 3, preferably fused together during the casting process. Catch hooks 15 for securing to a carrier part are necessary only at the two outer cable clamps. With this clamp device, four cables, with different diameters if necessary, can be fixed to a carrier part in a space-saving and rigid way. Just as easily as the cables are clamped, they can be disassembled again without risk of damage and the clamp device remains reusable as a whole, as described above for the individual cable clamps.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:

1. A cable clamp device comprising,
a base, said base being capable of affixing to a carrier part and comprising a bearing surface and a plurality of U limbs; and
a clamp cover, said clamp cover being capable of inserting between said plurality of U limbs and engaging with a cable, said clamp cover comprising a fixing element that is capable of rotating between an engaged and a disengaged position, wherein:
in said engaged position, said fixing element cooperates with transversely extending ribs formed on said plurality of U limbs such that said cable may be fixedly secured between said bearing surface and said clamp cover, and
in said disengaged position, said clamp cover is capable of being extracted from between said plurality of U limbs, and
said fixing element comprises an activation slot, a twistable shaft, and two opposing locking flaps projecting laterally from the fixing element.

2. The cable clamp device of claim 1, wherein said clamp cover further comprises clamp tabs which project laterally from a bottom side of said clamp cover, said clamp tabs being inclined relative to each other.

3. The cable clamp device of claim 2, wherein the clamp tabs contact and slide along the transverse extending ribs when the clamp cover is inserted between the plurality of U limbs.

4. The cable clamp device of claim 1, wherein the locking flaps comprise a ribbed groove.

5. The cable clamp device of claim 1, wherein said plurality of U limbs comprise two diagonally opposing stops for the clamp cover.

6. The cable clamp device of claim 1, wherein said base further comprises a catch hook, said catch hook being capable of securing said base to said carrier part.

7. The cable clamp device of claim 1, wherein said clamp cover is connected to said base by a flexible strip.

8. A cable clamp device comprising,
a base, said base being capable of affixing to a carrier part and comprising a bearing surface and a plurality of U limbs; and
a clamp cover, said clamp cover being capable of inserting between said plurality of U limbs and engaging with a cable, said clamp cover comprising a fixing element that is capable of rotating between an engaged and a disengaged position, wherein:
in said engaged position, said fixing element cooperates with transversely extending ribs formed on said plurality of U limbs such that said cable may be fixedly secured between said bearing surface and said clamp cover, and
in said disengaged position, said clamp cover is capable of being extracted from between said plurality of U limbs,
said clamp cover is connected to said base by a flexible strip, and
the flexible strip connects a top side of the fixing element to a top edge of one of said plurality of U limbs.

9. A cable clamp device comprising,
a base, said base being capable of affixing to a carrier part and comprising a bearing surface and a plurality of U channels; and
a clamp cover, said clamp cover being capable of inserting into said plurality of U channels, said clamp cover comprising a fixing element that is capable of rotating between an engaged and a disengaged position, wherein:
in said engaged position, said fixing element cooperates with transversely extending ribs formed in said plurality of U channels such that a cable may be fixedly secured in each of said plurality of U channels and between said bearing surface and said clamp cover,
in said disengaged position, said clamp cover is capable of being extracted from said plurality of U channels, and
said fixing element comprises an activation slot, a twistable shaft, and two opposing locking flaps projecting laterally from the fixing element.

10. The cable clamp device of claim 9, wherein said clamp cover further comprises clamp tabs that project laterally from a bottom side of said clamp cover, said clamp tabs being inclined relative to each other.

11. The cable clamp device of claim 10, wherein the clamp tabs contact and slide along the transverse extending ribs when the clamp cover is inserted into said plurality of U channels.

12. The cable clamp device of claim 9, wherein the locking flaps comprise a ribbed groove.

13. The cable clamp device of claim 9, wherein said clamp cover is connected to said base by a flexible strip.

14. The cable clamp device of claim 9, wherein each of said plurality of U channels comprises two diagonally opposing stops for the clamp cover.

15. The cable clamp device of claim 9, wherein said base further comprises a catch hook, said catch hook being capable of securing said base to said carrier part.

16. The cable clamp device of claim 9, wherein said fixing element is screw-head-shaped and comprises a twistable shaft and two opposing locking flaps projecting laterally from the fixing element.

17. The cable clamp device of claim 9, wherein said fixing element is screw-head-shaped and comprises a twistable shaft and two opposing locking flaps projecting laterally from the fixing element.

18. A cable clamp device comprising,
a base, said base being capable of affixing to a carrier part and comprising a bearing surface and a plurality of U channels; and
a clamp cover, said clamp cover being capable of inserting into said plurality of U channels, said clamp cover comprising a fixing element that is capable of rotating between an engaged and a disengaged position, wherein:
  in said engaged position, said fixing element cooperates with transversely extending ribs formed in said plurality of U channels such that a cable may be fixedly secured in each of said plurality of U channels and between said bearing surface and said clamp cover,
  in said disengaged position, said clamp cover is capable of being extracted from said plurality of U channels,
  said clamp cover is connected to said base by a flexible strip, and
the flexible strip connects a top side of the fixing element to a top edge of one of said plurality of U channels.

* * * * *